United States Patent
Tian

(10) Patent No.: US 8,514,604 B2
(45) Date of Patent: Aug. 20, 2013

(54) MONITORING SYSTEM FOR MONITORING SERIAL ADVANCED TECHNOLOGY ATTACHMENT DUAL IN-LINE MEMORY MODULE

(75) Inventor: Bo Tian, Shenzhen (CN)

(73) Assignees: Hong Fu Jin Precision Industry (Shenzhen) Co., Ltd., Shenzhen (CN); Hon Hai Precision Industry Co., Ltd., New Taipei (TW)

(*) Notice: Subject to any disclaimer, the term of this patent is extended or adjusted under 35 U.S.C. 154(b) by 6 days.

(21) Appl. No.: 13/340,646

(22) Filed: Dec. 29, 2011

(65) Prior Publication Data

US 2013/0155601 A1    Jun. 20, 2013

(30) Foreign Application Priority Data

Dec. 20, 2011   (CN) .......................... 2011 1 0429265

(51) Int. Cl.
| | |
|---|---|
| *G11C 5/06* | (2006.01) |
| *G06K 5/00* | (2006.01) |
| *H05K 7/00* | (2006.01) |
| *H05K 1/11* | (2006.01) |
| *H05K 1/14* | (2006.01) |
| *G06F 3/00* | (2006.01) |
| *G06F 13/28* | (2006.01) |

(52) U.S. Cl.
USPC ........ 365/63; 361/679.31; 361/803; 361/785; 365/64; 365/65; 710/13; 710/18; 710/19; 710/22

(58) Field of Classification Search
USPC ................ 361/679.31, 785, 803; 365/63, 64, 365/65

See application file for complete search history.

(56) References Cited

U.S. PATENT DOCUMENTS

| | | | | |
|---|---|---|---|---|
| 6,105,154 | A * | 8/2000 | Wang et al. .................... | 714/732 |
| 6,771,515 | B2 * | 8/2004 | McCall et al. ................ | 361/788 |
| 7,542,305 | B2 * | 6/2009 | Petersen et al. ............... | 361/785 |
| 8,379,391 | B2 * | 2/2013 | Amidi et al. .................. | 361/728 |

* cited by examiner

*Primary Examiner* — Hoa C Nguyen
*Assistant Examiner* — Robert Brown
(74) *Attorney, Agent, or Firm* — Altis Law Group, Inc.

(57) ABSTRACT

A monitoring system includes a serial advanced technology attachment dual-in-line memory module (SATA DIMM) with a circuit board, a motherboard having a monitoring unit, and a monitoring device. An edge connector is set on a bottom edge of the circuit board to engage in a memory slot of the motherboard. A SATA connector is arranged on the circuit board and connected to a storage device interface of the motherboard. The monitoring unit receives a working state signal and a data transfer rate signal of the SATA DIMM module and outputs the received signals to the monitoring device.

6 Claims, 2 Drawing Sheets

US 8,514,604 B2

MONITORING SYSTEM FOR MONITORING SERIAL ADVANCED TECHNOLOGY ATTACHMENT DUAL IN-LINE MEMORY MODULE

BACKGROUND

1. Technical Field

The present disclosure relates to a monitoring system for monitoring a serial advanced technology attachment dual in-line memory module (SATA DIMM).

2. Description of Related Art

Solid state drives (SSD) store data on chips instead of on moving magnetic or optical discs. One type of SSD has the form factor of a DIMM module and it is called a SATA DIMM module. The SATA DIMM module can be inserted into a memory slot of a motherboard, to add storage capacity. However, users may not be able to monitor working states of the SATA DIMM module when the SATA DIMM module is used, to be aware of the proper functioning or other state of the module. Therefore, there is room for improvement in the art.

BRIEF DESCRIPTION OF THE DRAWINGS

Many aspects of the embodiments can be better understood with reference to the drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the drawings, is illustrated by way of example and not by way of limitation. References to "an" or "one" embodiment in this disclosure are not necessarily to the same embodiment, and such references mean at least one.

Figure 1:
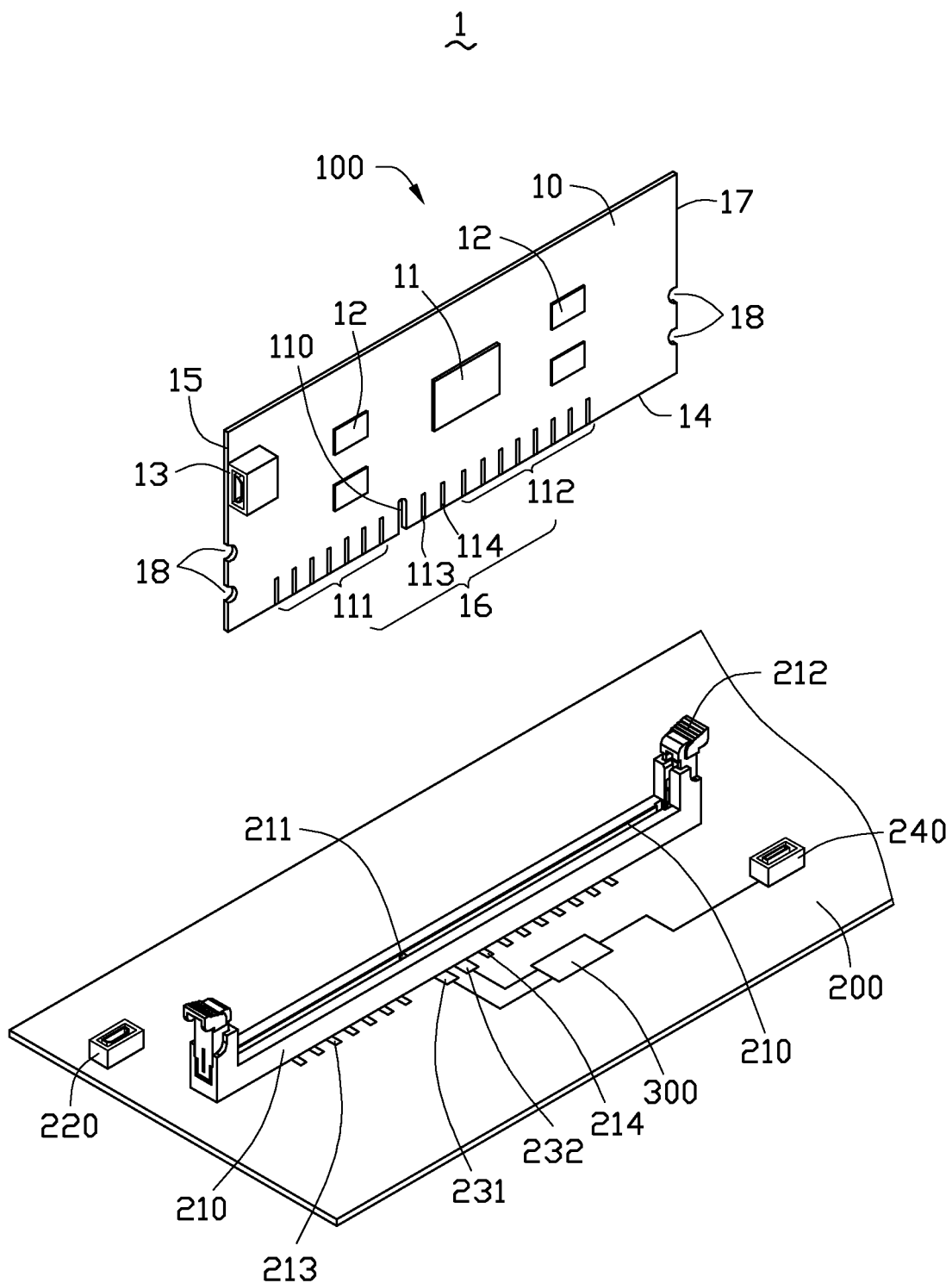
FIG. 1 is an exploded, isometric view of a monitoring system for monitoring a serial advanced technology attachment (SATA) dual in-line memory module (DIMM), in accordance with an exemplary embodiment of the present disclosure.
Figure 2:
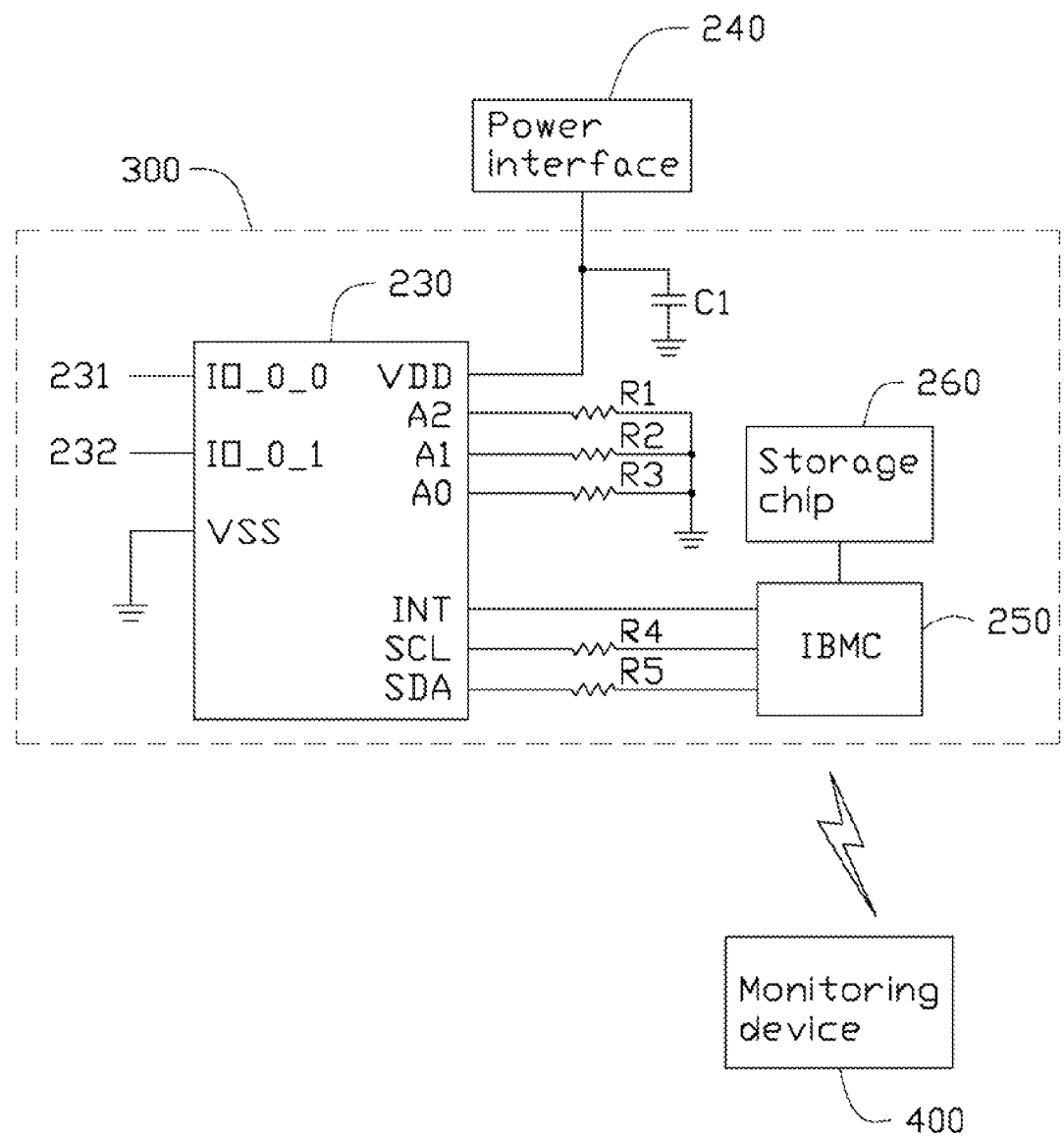
FIG. 2 is a circuit diagram of the monitoring unit of the monitoring system of FIG. 1.

FIGS. 1 and 2, show a monitoring system 1 used for monitoring a serial advanced technology attachment dual-in-line memory module (SATA DIMM) 100. The monitoring system 1 in accordance with an exemplary embodiment includes a motherboard 200 and a monitoring unit 300.

The SATA DIMM 100 includes a substantially rectangular circuit board 10. A control chip 11, a plurality of storage chips 12 connected to the control chip 11, and a SATA connector 13 connected to the control chip 11 are all arranged on the circuit board 10. An edge connector 16 is arranged on a bottom edge 14 of the circuit board 10 and an offset notch 110 is defined in one end of the bottom edge 14. The edge connector 16 includes a plurality of power pins 111, a plurality of ground pins 112, and two monitoring signal pins 113 and 114. The power pins 111 are connected to the control chip 11 and the storage chips 12. The ground pins 112 are connected to a ground layer (not shown) of the circuit board 10. The monitoring signal pins 113 and 114 are respectively connected to input/output (I/O) pins GPIO14 and GPIO15 (not shown) of the control chip 11. A pair of grooves 18 is defined in each of the two opposite ends 15 and 17 of the circuit board 10.

A memory slot 210, such as a double data rate type three (DDR3) or a double data rate type two (DDR2) memory slot, a storage device interface 220, a power interface 240, and the monitoring unit 300 are all arranged on the motherboard 200. The memory slot 210 includes a plurality of internal pins and a protrusion 211. The pins includes a plurality of power pins 213 corresponding to the power pins 111, a plurality of ground pins 214 corresponding to the ground pins 112, and two monitoring signal pins 231 and 232 respectively corresponding to the monitoring signal pins 113 and 114 of the circuit board 10. The power pins 213 and the ground pins 214 are respectively connected to a power layer (not shown) and a ground layer (not shown) of the motherboard 200. The monitoring signal pins 231 and 232 are connected to the monitoring unit 300. Two fixing elements 212 are arranged at opposite ends of the memory slot 210.

The monitoring unit 300 includes a collecting chip 230, a capacitor C1, resistors R1-R5, an integrated baseboard management controller (IBMC) 250, and a storage chip 260. Two input pins IO_0_0 and IO_0_1 of the collecting chip 230 are respectively connected to the monitoring signal pins 231 and 232. A voltage pin VDD of the collecting chip 230 is connected to the power interface 240 and also grounded through the capacitor C1. A ground pin VSS of the collecting chip 230 is grounded. I/O pins A2, A1, and A0 of the collecting chip 230 are grounded through the resistors R1, R2, and R3 respectively. An interrupt pin INT of the collecting chip 230 is connected to the IBMC 250, to receive an interrupt signal from the IBMC 250. A clock pin SCL of the collecting chip 230 is connected to the IBMC 250 through the resistor R4, to receive a clock signal from the IBMC 250. A data pin SDA of the collecting chip 230 is connected to the IBMC 250 through the resistor R5, to receive data signals from the IBMC 250. The storage chip 260 is connected to the IBMC 250 for storing data. The IBMC 250 communicates with a monitoring device 400 through a wired or wireless network. In one embodiment, the network is a wireless network.

In use, the edge connector 16 is inserted into the memory slot 210. The power pins 111 are connected to the power pins 213, the ground pins 112 are connected to the ground pins 214, and the monitoring signal pins 113 and 114 are connected to the monitoring signal pins 231 and 232. The protrusion 211 engages in the notch 110. The fixing elements 212 are engaged in the grooves 18. The SATA connector 13 is connected to the storage device interface 220 by a cable (not shown). The power interface 240 is connected to a power supply (not shown).

When the motherboard 200 receives power, the motherboard 200 outputs a voltage to the control chip 11 and to the storage chips 12 through the power pins 213 and 111. The motherboard 200 outputs a control signal, such as a SATA signal, to the control chip 11 through the storage device interface 220 and the SATA connector 13, to control the storage chips 12 to store data. The I/O pin GPIO14 of the control chip 11 outputs a working state signal to the input pin IO_0_0 of the collecting chip 230 through the monitoring signal pins 113 and 231. The I/O pin GPIO15 of the control chip 11 outputs a data transfer rate signal to the input pin IO_0_1 of the collecting chip 230 through the monitoring signal pins 114 and 232. The collecting chip 230 receives the working state signal and the data transfer rate signal and converts the working state signal and data transfer rate signal to system bus signals, and outputs the system bus signals to the IBMC 250. The IBMC 250 encodes the system bus signals and outputs the encoded signals to the monitoring device 400 through the network. The encoded signals can be stored in the storage chip 260. Thus, the monitoring device 400 can monitor normal or abnormal operations of the SATA DIMM 100.

In another embodiment, when the monitoring system 1 needs to monitor a plurality of SATA DIMMs, the monitoring signal pins of other memory slots receiving the plurality of SATA DIMMs are connected to other available pins of the collecting chip 230.

The monitoring system 1 can effectively monitor the SATA DIMM 100 through the monitoring unit 300, the memory slot 210, and the monitoring device 400.

Even though numerous characteristics and advantages of the disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A monitoring system comprising:
   a monitoring device;
   a motherboard comprising:
      a storage device interface;
      a power interface;
      a memory slot comprising:
         a plurality of first power pins, a plurality of first ground pins, and first and second monitoring signal pins; and
      a monitoring unit comprising:
         an integrated baseboard management controller (IBMC); and
         a collecting chip, wherein first and second input pins of the collecting chip are respectively connected to the first and second monitoring signal pins of the memory slot, a voltage pin of the collecting pin is connected to the power interface and also grounded through a capacitor, each of first to third input/output (I/O) pins of the collecting chip is grounded through a resistor, an interrupt pin of the collecting chip is connected to the IBMC, each of a clock pin and a data pin of the collecting chip is connected to the IBMC through a resistor; and
   a serial advanced technology attachment dual-in-line memory module (SATA DIMM) comprising:
      a circuit board;
      an edge connector set on a bottom edge of the circuit board and engaged in the memory slot, the edge connector comprising a plurality of second power pins connected to the first power pins, a plurality of second ground pins connected to the first ground pins, and third and fourth monitoring signal pins connected to the corresponding first and second monitoring signal pins;
      a control chip arranged on the circuit board and connected to the plurality of second power pins, wherein the control chip comprises first and second I/O pins, the first and second I/O pins of the control chip are connected to the corresponding third and fourth monitoring signal pins;
      a plurality of storage chips arranged on the circuit board, and connected to the plurality of second power pins and the control chip; and
      a SATA connector arranged on the circuit board, and connected to the control chip and the storage device interface of the motherboard;
   wherein the first and second I/O pins of the control chip respectively output a working state signal and a data transfer rate signal to the collecting chip through the third and fourth monitoring signal pins of the SATA DIMM module and the first and second monitoring signal pins of the memory slot, the collecting chip converts the received working state signal and data transfer rate signal, and outputs the converted signals to the IBMC, the IBMC encodes the converted signals and outputs the encoded signals to the monitoring device.

2. The monitoring system of claim 1, wherein the memory slot is a double data rate type three (DDR3) memory slot.

3. The monitoring system of claim 1, wherein the memory slot is a double data rate type two (DDR2) memory slot.

4. The monitoring system of claim 1, wherein a notch is defined in the bottom edge of the circuit board, the memory slot comprises a protrusion engaged in the notch.

5. The monitoring system of claim 1, wherein the circuit board is rectangular, two grooves are defined in two opposite ends of the circuit board, two fixing elements are arranged at two opposite ends of the memory slot, to engage in the grooves of the circuit board.

6. The monitoring system of claim 1, wherein the monitoring unit further comprises a storage chip connected to the IBMC, to store the working state signal and the data transfer rate signal encoded by the IBMC.

* * * * *